Feb. 13, 1962 E. T. STROM 3,020,881
CATTLE FEEDER
Filed June 23, 1959
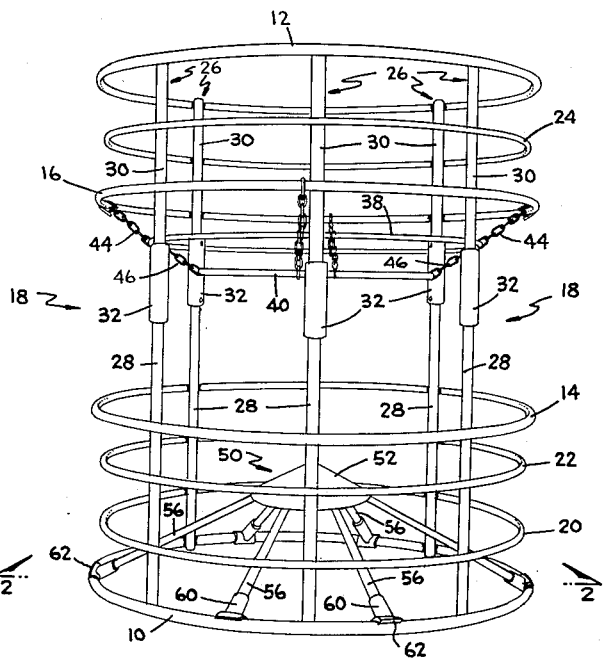
Fig 1
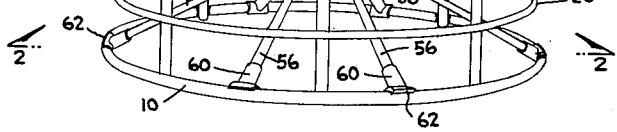
Fig 2
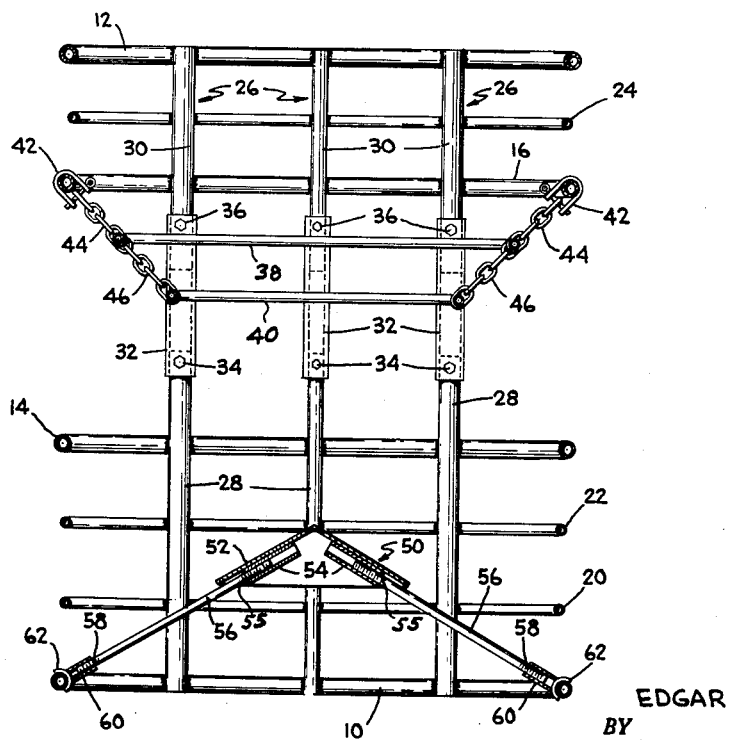
INVENTOR.
EDGAR T. STROM
BY
Stuart R. Peterson
ATTORNEY

United States Patent Office 3,020,881
Patented Feb. 13, 1962

3,020,881
CATTLE FEEDER
Edgar T. Strom, Beulah, N. Dak.
Filed June 23, 1959, Ser. No. 822,360
14 Claims. (Cl. 119—58)

This invention relates generally to cattle feeders and pertains more particularly to a feeder that can be readily moved from place to place on a farm or ranch.

One object of the invention is to provide a lightweight feeder for cattle that can be moved to various locations on a farm or ranch. More specifically, it is an aim of the invention to provide a feeder comprised of a plurality of spaced rings held in a spaced relation by means of a number of interconnecting posts. By turning the feeder on its side, the rings allow the structure to be easily rolled to where it is most needed. When again upended, the feeder is ready for use.

Another object of the invention is to provide a feeder that can be inverted, the feeder when resting on one end accommodating cattle of one size and when resting on its other end accommodating cattle of a different size. Stated somewhat differently, it is an aim of the invention to provide a single feeder that can serve either grown cattle or calves. While it is contemplated that several or more feeders will be normally used, the specific number depending of course on the size of the ranch or farm, the use of one such feeder for calves by reason of the envisaged construction will discourage use of this particular feeder by fully grown cattle and vice versa.

A further object is to provide a cattle feeder having an access opening that can be easily adjusted as to size.

Still another important object of the invention is to provide a cattle feeder having incorporated thereinto what will be termed a feed saving device. This highly useful accessory normally impedes the free gravitational dropping of feed to the access opening, yet through gentle nudging by the cattle will release more feed to replenish that which has been consumed.

A further object of the invention is to provide feeding apparatus for cattle that will direct or spread the feed that has dropped past the above-mentioned feed saving device outwardly to a locus within easy reach of the cattle.

Yet another object of the invention is to provide a feeder that is highly sanitary, due especially to the fact that the feed is exposed to sunlight and air arriving from substantially all directions.

Also, a further feature of the invention is to provide a feeder that will permit a relatively large number of cattle to feed at one time.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIGURE 1 is a perspective view of my cattle feeder, and

FIGURE 2 is an elevational sectional view taken through the center of the feeder in the direction of line 2—2 of FIGURE 1.

Referring now in detail to the drawing, the cattle feeder there depicted for the purpose of exemplifying my invention comprises a relatively heavy tubular ring 10 at the bottom and a relatively heavy tubular ring 12 at the top. An intermediate pair of rings 14, 16 of similar stock are spaced sufficiently to provide six access openings at 18 through which the cattle can feed. As will presently be made manifest, the size of these openings may be adjusted.

Spaced equally between the rings 10 and 14 are additional tubular rings 20 and 22. However, these rings are of lighter weight stock than the rings 10–16. Also, a ring 24 is disposed equidistant between the rings 12 and 16, this ring being commensurate in gauge with the rings 20 and 22. Thus the various rings that have been referred to are located at equally spaced elevations with respect to each other with the exception of the pair 14 and 16, these rings having a larger spacing in order to form the openings 18.

The ring spacing is maintained by means of six identical posts 26. Each post 26 is composed of straight tubular sections 28, 30 and an adjustable tubular collar 32 into which the sections 28, 30 telescope. In this regard it will be appreciated that the posts 26 form the vertical sides of the six openings 18. Through the agency of a pair of set screws or bolts 34, 36 (see FIGURE 2) the sections 28 and 30 may be maintained in a desired relationship with respect to each other, and in this way the size of the openings 18 may be adjusted.

While other fastening means might be employed, it will be assumed that welding is used to secure angularly spaced portions of the rings 10–16 and 20–24 to the posts 26. More specifically, it will be seen that the rings 10, 14, 20 and 22 are welded directly to the sections 28, whereas the rings 12, 16 and 24 are welded to the sections 30.

Within the structure thus far described is what will be termed a feed saving device which includes a pair of smaller diameter tubular rings 38 and 40. It will be observed that the upper ring 38 is the larger of the two, although it is of smaller diameter than the earlier described rings. These rings are suspended by a series of shackles 42 encircling the ring 16, each shackle 42 having a section of chain 44 attached thereto and the lowermost link of the chain encircling the ring 38. The other ring 40 is supported in a somewhat similar manner from the ring 38 via a plurality of chain sections 46 having its end links encircling the two rings or otherwise connected thereto. The use of the shackles 42 allow these rings 38, 40 to be readily detached and removed for a purpose soon to be explained.

Next to be described is the spreader device which has been denoted in its entirety by the reference numeral 50. This device comprises a central cone 52 of sheet metal provided with a number of internally threaded tubular sockets 54 (see FIGURE 2) welded to the underside of the cone 52. Received in these sockets 54 are threaded upper ends of downwardly sloping and outwardly diverging rods 56. The lower ends of these rods 56 are threaded at 58 for engagement with tubular sockets 60 which are internally threaded. The threaded end 55 may be assumed to be a right hand thread and the end 58 a left hand thread. The sockets 60, by reason of their threaded connection to the rods 56, are detachable to enable the device 50 to be removed, the desirability for which will presently be explained. The sockets 60 are forked at one end so as to provide curved fingers 62 capable of straddling portions of the bottom ring 10. Through the agency of the threaded arrangement it is possible to adjust each rod 56 individually so that the spreader 50 is tightly retained in place.

Having presented the foregoing description, it is believed that the manner of using my cattle feeder will be readily understood. However, further explanation will undoubtedly be of assistance in providing a full appreciation of the benefits to be derived from the utilization of the illustrated feeder.

First, it may be pointed out that the collars 32 are adjusted on the sections 28 and 30 so as to provide openings 18 of the appropriate height for the cattle that is intended to use the feeder. This adjustment is made easier with the feeder turned on its side. When the desired height of opening has been achieved, the bolts or set screws 34 and/or 36 (whether both groups of set screws are originally loosened depends upon the degree of opening that is wanted) are tightened, thereby maintaining the opening size.

At this stage, it should be stressed that the cattle feeder, while on its side, can be manually rolled to whatever section of the farm or ranch where it is most needed. The ring construction readily permits this. In this regard, it will be observed that the various ring members 10–16 and 20–24 lie exteriorly of the posts 26 and therefore do not offer any resistance to rolling because their periphery contacts the ground to be traversed.

Installation of the feed saving device is best achieved, too, while the feeder is on its side. It will be noted that the shackles 42 allow the feed saving device to be quickly attached, especially inasmuch as in its preferred form the rings 38, 40 are permanently chained together and can be installed as a unit.

Next, the farmer or rancher can add the spreader 50. Actually, if the device 50 has been used before, say at the other end in engagement with the ring 12, little adjustment of the rods 56 will have to be made. Rotation of the rods farther into the socket means 54 and 60 will permit easy attachment. This is so so by virtue of the reverse threading at the ends of the rods 56. The fingers 62 belonging to the sockets 60 on the various rods 56 should then be placed in a straddling relation with the ring 10. Backing the rods 56 out of the socket means 54 and 60 will provide a firm pressural retention of the device 50 within the structure.

An assumption has been made that the cattle feeder is to be readied for grown cattle. Accordingly, the shackles 42 have been connected to the ring 16 and not the ring 14. This assumption has also dictated that the spreader device 50 be attached to the ring 10 and not the ring 12. Owing to the fact that the post sections 28 have a second lighter weight ring secured thereto, the openings 18 are at a higher elevation when the feeder is resting on the ring 10 than when inverted and resting on the ring 12. Thus the feeder will accommodate larger cattle when placed on the ring 10, this being the position of the device in the drawing.

With the cattle feeder assembled as above-outlined it is ready for the introduction of feed. The feed may take a variety of forms. For instance, it may be hay, alfalfa, silage and the like. When feed is added through the upper ring 12 it falls downwardly, of course. However, the rings 38 and 40 impede the free fall of feed to a certain extent due to the funnel-shaped effect they provide. Although some of the feed initially passes by the ring 40 onto the spreader 50, the point to be made, though, is that the feed does not become packed at the bottom of the feeder as it would without the feed saving rings 38 and 40. Even baled hay from which the string or wire have been removed will not interefere with the overall free flowing attributes of my feeder. The ensuing condition allows a certain amount of aeration to take place throughout the lower portion of the feed that could not otherwise occur. Yet the rings 38 and 40 can be easily nudged or jostled by the cattle to aid further dropping of feed.

Although the spreading device is instrumental in causing the feed that has dropped below the feed saving device to slide outwardly where it can be more readily reached by the cattle, recognition is made of the fact that cattle are prone to shove and push against feeders. Therefore, the ring 14 (as is the ring 16 since it assumes the relative position of ring 14 when the feeder is inverted) is fabricated of heavier stock than the rings 20, 22 (and the ring 24). By making the rings 10 and 12 quite heavy, equaling that of the rings 14 and 16, the feeder can withstand relatively large internal loads. Stated somewhat differently, the lightweight characteristics of the feeder are preserved, yet an exceptionally rigid construction is produced that is capable of withstanding the forces exerted upon it by the cattle using the feeder.

As many changes could be made in the above construction and many apparently widely different embodiments of the invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A cattle feeder comprising a plurality of vertically spaced circular ring members, a number of vertical posts secured to angularly spaced portions of the ring members for maintaining said ring members in their vertically spaced relationship, and an intermediate pair of said ring members being spaced sufficiently to form openings of a size to permit access of the heads of cattle to feed placed within the confines of said members.

2. A cattle feeder in accordance with claim 1 in which said ring members are generally equally spaced from said openings toward either end, there being more ring members toward one end than the other whereby said feeder may be inverted to accommodate cattle of a different height.

3. A cattle feeder in accordance with claim 1 in which the ring members at either end plus said pair of ring members are of heavier stock than the other ring members.

4. A cattle feeder in accordance with claim 1 in which said ring members encircle said posts.

5. A cattle feeder comprising a plurality of vertically spaced ring members of one diameter, an intermediate pair of said ring members being spaced sufficiently to form an opening of a size to permit access of the heads of cattle to food placed within the confines of said members, a number of vertical posts secured to angularly spaced portions of the ring members for maintaining said vertically spaced relationship, and an additional pair of ring members deflectably suspended at two different elevations within the confines of said plurality of ring members, said additional pair of ring members being of smaller size than the other ring members.

6. A cattle feeder in accordance with claim 5 in which one of said additional ring members is smaller than the other of this particular pair.

7. A cattle feeder in accordance with claim 5 including means for adjusting the length of said posts, said means being disposed between the rings forming the top and bottom of the openings so as to vary the height of said openings.

8. A cattle feeder comprising a plurality of vertically spaced ring members, a number of vertical posts secured to angularly spaced portions of the ring members for maintaining said ring members in their vertically spaced relationship, an intermediate pair of said ring members being spaced sufficiently to form openings of a size to permit access of the heads of cattle to feed within the confines of said members, a first additional ring member of smaller diameter than said plurality of ring members, first flexible means suspending said additional ring member from one of the ring members above said openings, a second additional ring member of smaller diameter than the first, and second flexible means suspending said second additional ring member from said first additional ring member.

9. A cattle feeder in accordance with claim 8 in which said first flexible means is detachable from said one of the plurality of ring members.

10. A cattle feeder in accordance with claim 8 in which said openings are nearer one end of the feeder than the other.

11. A cattle feeder comprising a ring member at each end, a plurality of intermediate ring members, a number of vertical posts secured to angularly spaced portions of said ring members for maintaining said end ring members in a fixedly spaced relation with each other and with said intermediate ring members, said intermediate ring members being spaced to form a plurality of feeding openings between said posts, at least one pair of progressively smaller ring members, flexible means suspending all of said progressively smaller ring members for deflectable movement relative to the other of said ring members with the smaller ring member being at an elevation corresponding generally to the location of said feeding openings so as to be deflectable by cattle feeding through said openings to cause feed to pass gravitationally therethrough, and means spaced beneath said smaller ring member for spreading the feed that has dropped therethrough outwardly to locations more nearly subjacent said openings.

12. A cattle feeder in accordance with claim 11 in which said progressively smaller ring members may be connected nearer either end of the feeder depending upon which of said end ring members is uppermost and said spreading means is connectable to whichever end ring member is lowermost.

13. A cattle feeder in accordance with claim 12 in which said flexible means is connectable to a ring member via a plurality of detachable shackles.

14. A cattle feeder in accordance with claim 12 in which said spreading means includes a plurality of threaded rods threadedly engaged with a central cone at one end and threadedly engaged with a plurality of elements abutting the lowermost end ring member.

References Cited in the file of this patent

UNITED STATES PATENTS

| | | |
|---|---|---|
| 375,824 | Light | Jan. 3, 1888 |
| 655,504 | Morris | Aug. 7, 1900 |
| 1,234,349 | Kohlmeier | July 24, 1917 |
| 2,618,238 | Travis | Nov. 18, 1952 |